United States Patent
Schmidt et al.

[11] Patent Number: 6,022,600
[45] Date of Patent: Feb. 8, 2000

[54] HIGH-TEMPERATURE FLUID MOUNTING

[75] Inventors: Warren E. Schmidt, Erie; Randall S. Wayland; James R. Halladay, both of Fairview; Tejbans S. Kohli, Erie, all of Pa.

[73] Assignee: Lord Corporation, Cary, N.C.

[21] Appl. No.: 07/873,309

[22] Filed: Apr. 24, 1992

[51] Int. Cl.[7] .................................................. B29D 22/00
[52] U.S. Cl. .......................... 428/35.9; 428/421; 428/446; 428/447; 428/450; 267/140.11; 267/140.13
[58] Field of Search ................... 428/35.7, 35.8, 428/35.9, 421, 463, 446, 447, 450; 267/140.11, 140.13

[56] References Cited

U.S. PATENT DOCUMENTS

| | | | |
|---|---|---|---|
| 2,885,202 | 5/1959 | Trumper | 267/15 |
| 2,991,992 | 7/1961 | Elsner | 267/1 |
| 3,193,239 | 7/1965 | Monroe | 248/400 |
| 4,084,668 | 4/1978 | Rybicki | 188/312 |
| 4,236,607 | 12/1980 | Halwes et al. | 188/1 B |
| 4,271,938 | 6/1981 | Berger | 188/280 |
| 4,613,118 | 9/1986 | Morita | 267/140.1 |
| 4,720,087 | 1/1988 | Duclos et al. | 267/140.1 |
| 4,728,317 | 3/1988 | Martz et al. | 474/110 |
| 4,733,758 | 3/1988 | Duclos et al. | 188/267 |
| 4,772,407 | 9/1988 | Carlson | 252/74 |
| 4,811,919 | 3/1989 | Jones | 244/54 |
| 4,858,898 | 8/1989 | Nikura et al. | 267/218 |
| 4,896,754 | 1/1990 | Carlson et al. | 192/21.5 |
| 4,921,080 | 5/1990 | Lin | 188/299 |
| 4,923,057 | 5/1990 | Carlson et al. | 188/378 |
| 5,108,045 | 4/1992 | Law et al. | 244/54 |
| 5,197,692 | 3/1993 | Jones et al. | 244/54 |

OTHER PUBLICATIONS

*Silicone Rubber Isolators In Vibration Protection*, Nakamura and Fukuda, Shin–Etsu Chemical Co., Ltd, Feb., 1989.
*The Effect of Crosslink Structure on the Dynamic/Mechanical Properties of Poly(Dimethylsiloxane) Elastomers*, Halladay and Warley, Lord Corporation, presented at the 134th meeting of the Rubber Division, American Chemical Society, Oct. 18, 1988.
*Galden Electronic Fluids Brochure*.

*Primary Examiner*—Jose' G. Dees
*Assistant Examiner*—Michael A. Williamson
*Attorney, Agent, or Firm*—Randall S. Wayland

[57] ABSTRACT

A mounting (20) which provides superior isolation yet which eliminates damaging edge-induced shear strain (ENT) buildup in the elastomer sections (28) and (30) when exposed to high temperatures by having a first elastomer section (28) loaded in compression and a second elastomer section (30) loaded in shear. Exposing the mounting (20) to elevated temperature environments allows the first elastomer section (28) to expand in height and places the second elastomer section (30) in shear to accommodate the height change. The instant invention compensates for fluid and elastomer expansion due to high temperatures by providing a mechanical type compensator (37) which takes up less space and eliminates the pressure loss associated with air-charged compensators (99). Further, a unique combination of fluorinated fluids and polysiloxane polymer enables the mounting (20) to withstand temperatures of greater than 200 deg F. for extended periods of time.

21 Claims, 12 Drawing Sheets

HIGH-TEMPERATURE FLUID MOUNTING

FIELD OF THE INVENTION

This invention relates to the area of mountings for attachment between a supported member and a supporting member. Specifically, the invention relates to the area of mountings of the fluid and elastomer type for providing vibration isolation between a supported and a supporting member.

BACKGROUND OF THE INVENTION

Mountings for attachment between a supporting member and a supported member which use a combination of fluid and elastomer have been proposed in a variety of applications including on aircraft, automobiles, boats and for supporting many types of engines. The elastomer, typically natural rubber, provides the stiffness needed for static support of the supported member. The fluid, typically glycol or silicone, provides i) excellent vibration isolation by tuning the fluid mass, or ii) damping by throttling the fluid, or iii) combinations thereof.

U.S. Pat. No. 4,236,607 hereby incorporated by reference, describes a fluid mounting or vibration isolator which uses a tuned fluid, specifically mercury, to generate amplified counter-inertial forces. Although the isolator performed acceptably, mercury has the disadvantages that it is toxic and very corrosive.

The commonly assigned Jones U.S. Pat. No. 4,811,919 hereby incorporated by reference, describes a volume compensated fluid mounting of the double-pumping or double-acting variety, including a volume compensator of the air-charged type. The air-charged compensator is used to accommodate the displaced fluid volume due to exposing the mounting to elevated temperatures. This type of mounting is particularly useful for attaching an aircraft engine to an aircraft strut at the front mounting location where the environment is comparatively cool (about 150 deg F.). Although adequate for the cooler front mount application, the Jones '919 mounting would be inadequate for most aft mount applications, where the temperature generally will exceed 200 deg F., and may exceed 300 deg F. The Jones '919 mounting has the disadvantage that, as it is exposed to high-temperature environments, it will build up edge induced compression strains (ENT's) or bulge strains in the elastomeric elements 35 and 36. This is because the elastomeric elements 35 and 36 are constrained or fixed between a frame 20 and a support member 30 which includes flanges 31 and 32. This type of mounting will be referred to as a constrained-type mounting. As the elevated temperatures cause the elastomeric elements 35 and 36 to heat up, bulge strains will build up at the surface of the elastomeric elements 35 and 36. These bulge strains alone, at very elevated temperatures can be enough to rupture the bond on this type of mounting. More commonly, these high bulge strains due to temperature, in combination with the high bulge strains due to operating loads imparted to the mountings, will cause damage to the elastomer sections 35 and 36.

Furthermore, these constrained-type mountings need to be molded at high pressures to ensure that none of the elastomer sections 35 and 36 are placed in tension while under the application of load. In essence, the high-pressure bonding provides pre-compression to the elastomer sections. As is known to those skilled in the art, placing a laminated section in tension is undesirable because cavitation in the elastomer that may occur. High-pressure bonding requires special bonding procedures and molds and adds undesirable complexity to the mold and processing of the mounting.

Fluid mountings which use an air-charged compensator have a further disadvantage in that they require a large envelope to house the compensator assembly, when employed in high-temperature applications. Typically, greater than five times the expansion volume of the fluid is required for proper sizing of an air-charged compensator to ensure that high pressures do not build up within the mounting and air-charged compensator. This is true for two reasons. One, not only is the mounting exposed to elevated temperature, but so too, is the air chamber within the air-charged compensator. Consequently, the air-charged compensator will also build up high pressures within it. Therefore, in order to minimize the pressure increase, the volume of the air chamber within the air-charged compensator is made large. Secondly, as the fluid in the mounting expands into the fluid expansion chamber, the volume of air in the air chamber decreases proportionately, and the pressure in the air-charged compensator, and thus the mounting, increases. Again, in order to minimize this pressure increase, the volume within the air chamber is made large.

Co-pending application Ser. No. 07/706,622 filed on May 29, 1991 entitled "Adaptive Fluid Mount" describes a fluid mounting which utilizes an air-charged compensator and constrained-type elastomer sections. This type of fluid mounting is particularly useful for front engine mount applications where the temperature environment is comparatively cool. The mounting is adjustable in that the lengths and diameters of the inertia tracks differ to provide tunability without having to rebond the mounting. However, the amount of tuning available is limited, since the inertia term alone will allow one to tune the mounting only so far. Alternatively, tuning could be accomplished by tearing the mount apart to effect a change in the volume stiffness requiring rebonding the entire mounting. However, this is a very expensive proposition.

In addition to the aforementioned problems of the related mountings, the currently known elastomer-and-fluid combinations used in fluid mountings will tend to degrade and break down the elastomer section, over time, when they are exposed to elevated temperature environments. The degradation process will include fluid migrating into the elastomer sections, swelling them, and lessening their tensile strengths. Further, fillers and other ingredients within the elastomer sections will leach into the fluid and contaminate it, and may change its viscosity which can impact the fluid mount's performance.

Previous fluid mountings have used combinations of natural rubber elastomers and silicone or glycol fluids. Natural rubber elastomers are chosen particularly for their strength and resiliency for use in mountings, and particularly for use in dampers and isolators. Glycol and silicone fluids are used for their low cost and inert properties. However, the combination of natural rubber and glycol or silicone fluids is generally limited in operation, for extended periods, to temperatures less than about 200 deg F. If this combination is used in environments which see temperatures in excess of 200 deg F. for extended periods, conventional fluids, such as glycol or silicone fluids, will aggressively attack the elastomer and may attack the bond formed at the elastomer/metal interface, as well. Continued exposure to elevated temperatures will, eventually, cause the elastomer to revert and become gummy in consistency. These elevated temperature environments, generally encountered in aircraft applications, and especially aft mount applications, require a fluid and elastomer combination which will be compatible at elevated temperatures over extended periods of time.

Co-pending application Ser. No. 07/514,071 now U.S. Pat. No. 5,108,045 filed on Apr. 25, 1990 entitled "Engine Mounting Assembly" describes an engine mounting which provides for the elastomer sections to be loaded in pure shear or pure compression, thus leading to enhanced service life, and linearity. This type of engine mounting is particularly useful for aft engine mount situations where the temperatures are severe.

SUMMARY OF THE INVENTION

In light of the inability of the related mountings to provide a fluid mounting which is suitable in high-temperature applications, it is therefore a primary object to provide a fluid mounting which can perform well in, and survive elevated-temperature environments, such as seen in aft engine mounting applications for aircraft.

It is another object to provide a fluid mounting which eliminates the need for precompressing the elastomer sections, whether through high-pressure bonding or mechanical precompression.

It is yet another object to provide a fluid mounting which provides superior vibration isolation while eliminating the compression induced edge strain (ENT) buildup experienced by the related constrained-type double-acting mountings when exposed to high-temperature environments.

It is yet another object is to provide a double-acting mounting which easily provides tuning of one of the elastomer sections, and thus the volume stiffness, without having to rebond the entire mountingi.

It is yet another object is to provide a double-acting mounting which uses a mechanical volume compensator which is not itself temperature sensitive to compensate for expansion of the fluid and elastomer, rather than the previously discussed air-charged compensator, thereby reducing the size required for the compensator assembly and increasing the reliability.

It is a further object to provide a mounting which can survive elevated temperatures of greater than 200 deg F. for extended periods by utilizing a novel combination of polysiloxane polymers and fluorinated fluids.

In summary, these and other objects are accomplished by providing a fluid mounting including a first fluid chamber partially defined by a first elastomeric section, a second fluid chamber partially defined by a second elastomeric section, the first and second fluid chambers being interconnected by a fluid passageway. The first elastomeric section acts primarily only in compression along a first axis, while the second elastomer section acts primarily only in shear. Furthermore, the stiffness of the first elastomer section, which is loaded in compression, is substantially greater along a particular axis than that of the second elastomer section which is loaded in shear. Because of this, when the mounting is exposed to elevated temperature environments, the first elastomer section will expand in height and the second elastomer section will accommodate this expansion through direct shear. In a departure from the art, the mounting utilizes a novel mechanical-type compensator to accommodate the fluid expansion and allow adjustment of the pressurization in the mounting.

Finally, a novel combination of polysiloxane polymer and fluorinated fluid provides the unique properties and stability required for long term use at elevated temperatures, while providing the properties required for excellent vibration isolation at elevated temperatures.

The abovementioned and further objects, features and advantages of the high-temperature fluid mounting of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE PREFERRED EMBODIMENTS

Figure 1:
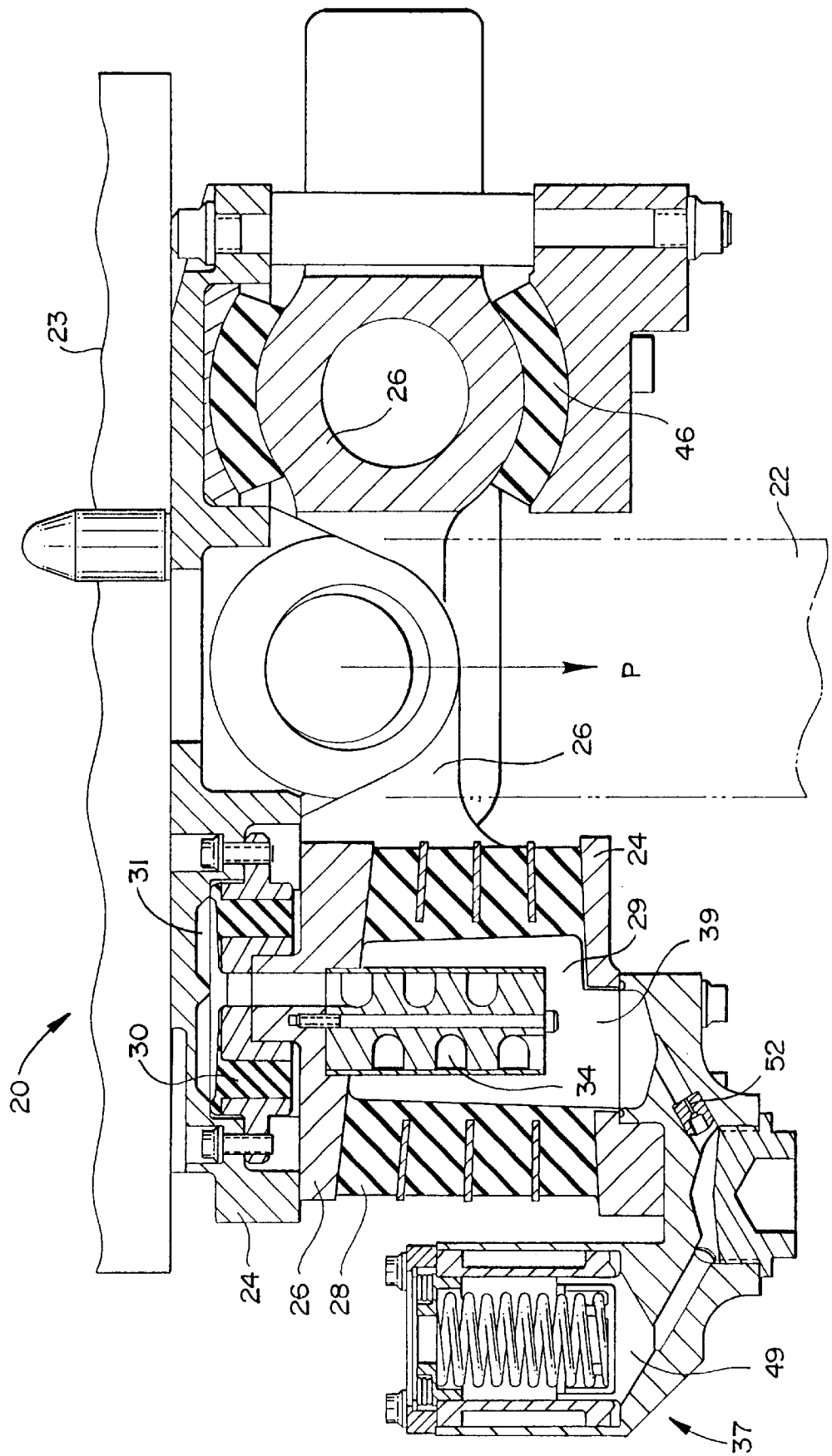
FIG. 1 is a partially-sectioned side view of a first embodiment of the fluid mounting.

A first embodiment of the high-temperature fluid mount of the present invention is shown in FIG. 1 generally at 20. The mounting 20 flexibly connects a supported member 22 such as an aircraft engine or auxiliary power unit (APU) to a supporting member 23 such as an aircraft strut, frame structure, or the like. The mounting however, can be used in any application requiring a high-temperature fluid mounting. The mounting 20 further includes a housing 24 which is attached to either one of said supporting member 23 and said supported member 22. A piston 26 is included for oscillating a fluid. Piston 26 is attached to the other of said supporting member 23 and said supported member 22. Adjacent said piston 26 is a first elastomer section 28 partially defining a first fluid chamber 29. Also adjacent said piston 26 on the opposite side thereof is a second elastomer section 30 partially defining a second fluid chamber 31.

A fluid passageway 34, shown including a spiral section, interconnects the first fluid chamber 29 and the second fluid chamber 31. A mechanical compensator 37 is attached to housing 24 and accommodates the displaced fluid 39 due to changes in temperature, and also provides the means for pressurizing the fluid 39 contained within the mounting 20.

Generally, as static load P is applied to piston 26, the piston in this embodiment will rotate about generally tubular pivot 46 and fluid 39 is displaced from first fluid chamber 29 through passageway 34, which, preferably, includes a spiral section, into the second fluid chamber 31. As the mounting 20 is oscillated dynamically due to input vibrations from the supporting member 23 or supported member 22, the fluid 39 oscillates through passageway 34 in a phased relationship to the input vibration. The fluid passageway 34 includes a length and a cross-sectional area. The length and cross-sectional area can be tuned to provide a fluid notch in an isolator-type mounting, i.e., a low point in the dynamic spring rate curve at a particular frequency.

In a mounting 20 of the isolator-type, this phased relationship causes the fluid notch to occur at a predetermined frequency, which usually coincides with an operating frequency, as is understood by those skilled in the art. This notch frequency has a notch depth dependent upon the hysteretic damping in the elastomer sections 28 and 30 and upon the viscous damping caused by throttling fluid 39 through the fluid passageway 34. The components of the mechanical compensator 37 are in direct fluid communication or in fluid contact with a third fluid chamber 49. The third fluid chamber 49 is dynamically separated from the first or second fluid chambers 29 or 31 by way of orifice 52. The orifice is small in diameter, typically about 0.060 inches, or less, and as long as practical. This small size and long length, dynamically locks out, or dynamically separates, the third fluid chamber 49 such that it does not affect the dynamic characteristics of the mounting 20.

Figure 2:
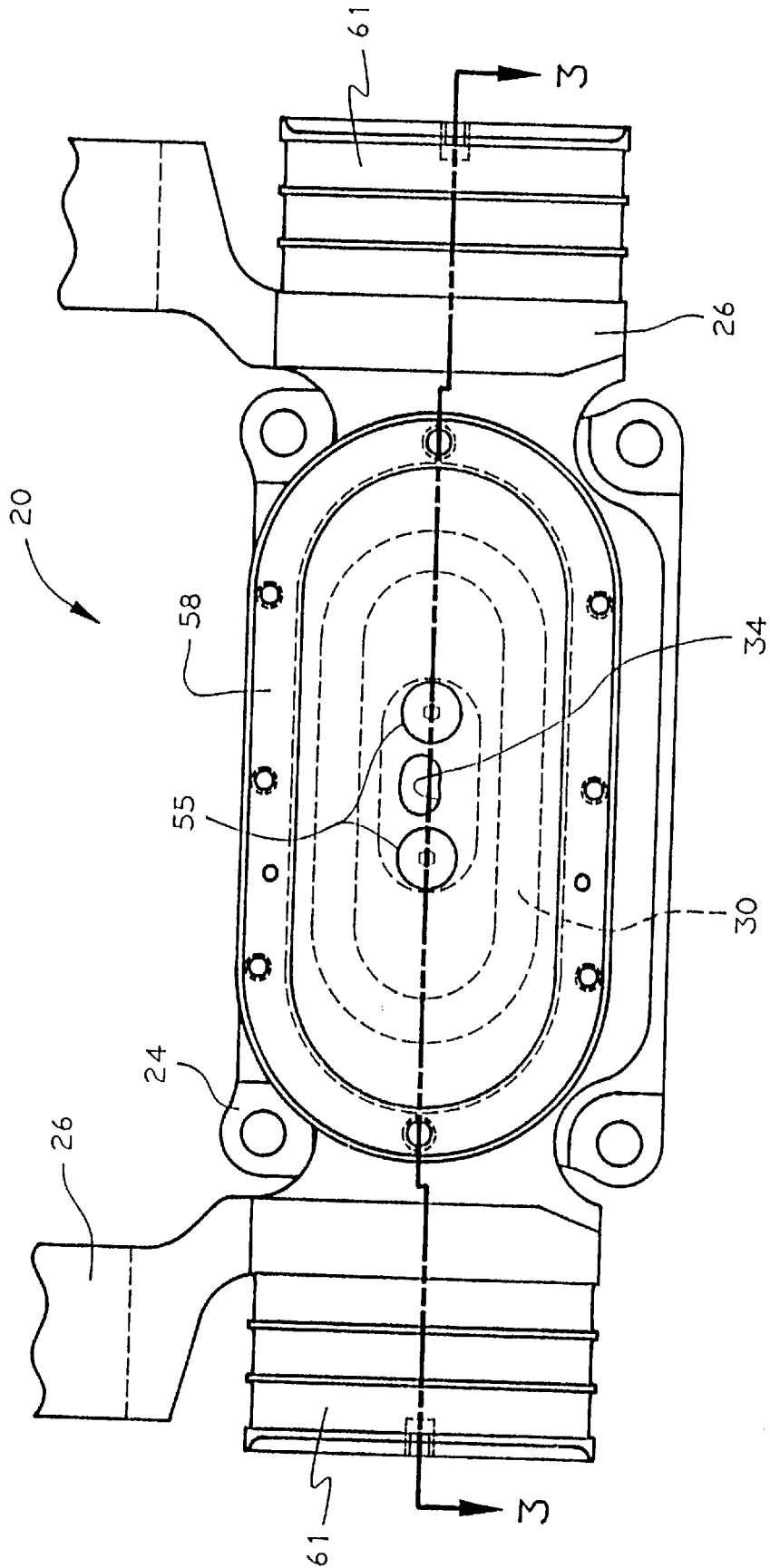
FIG. 2 is a partial top view of a portion of the first embodiment of the fluid mounting showing the second elastomeric section with a portion of the housing not shown for clarity.

Referring now to FIG. 2, a top view of a portion of the first embodiment of the mounting 20 is shown with the top portion of the housing 24 removed for clarity. The second elastomer section 30, which is preferably oval in shape, attaches to the piston 26 by way of bolts 55. This enables the second elastomer section 30 to be easily removed and rebonded in another elastomer stiffness. Accordingly, the volume stiffness of the mounting 20 can be easily tuned without having to rebond the entire mounting. Together with the changes that can be made to the length and cross-sectional area of the fluid passageway 34, this allows the fluid mounting 20 dynamic characteristics to be easily tuned over a wider range of frequencies than afforded by prior devices.

A flange 58, which is also preferably oval in shape, is adjacent or bonded to the second elastomer section 30. Further, the flange 58 is connected to the upper portion of the housing (not shown), by way of bolts. The fluid passageway 34 is shown passing through the piston 26, but the passageway 34 could be external from the mounting 20 and pass from first fluid chamber 29 to second fluid chamber 31 without passing through the piston 26. Lateral pads 61 are shown, but are auxiliary and do not form a part of the invention.

Figure 3:
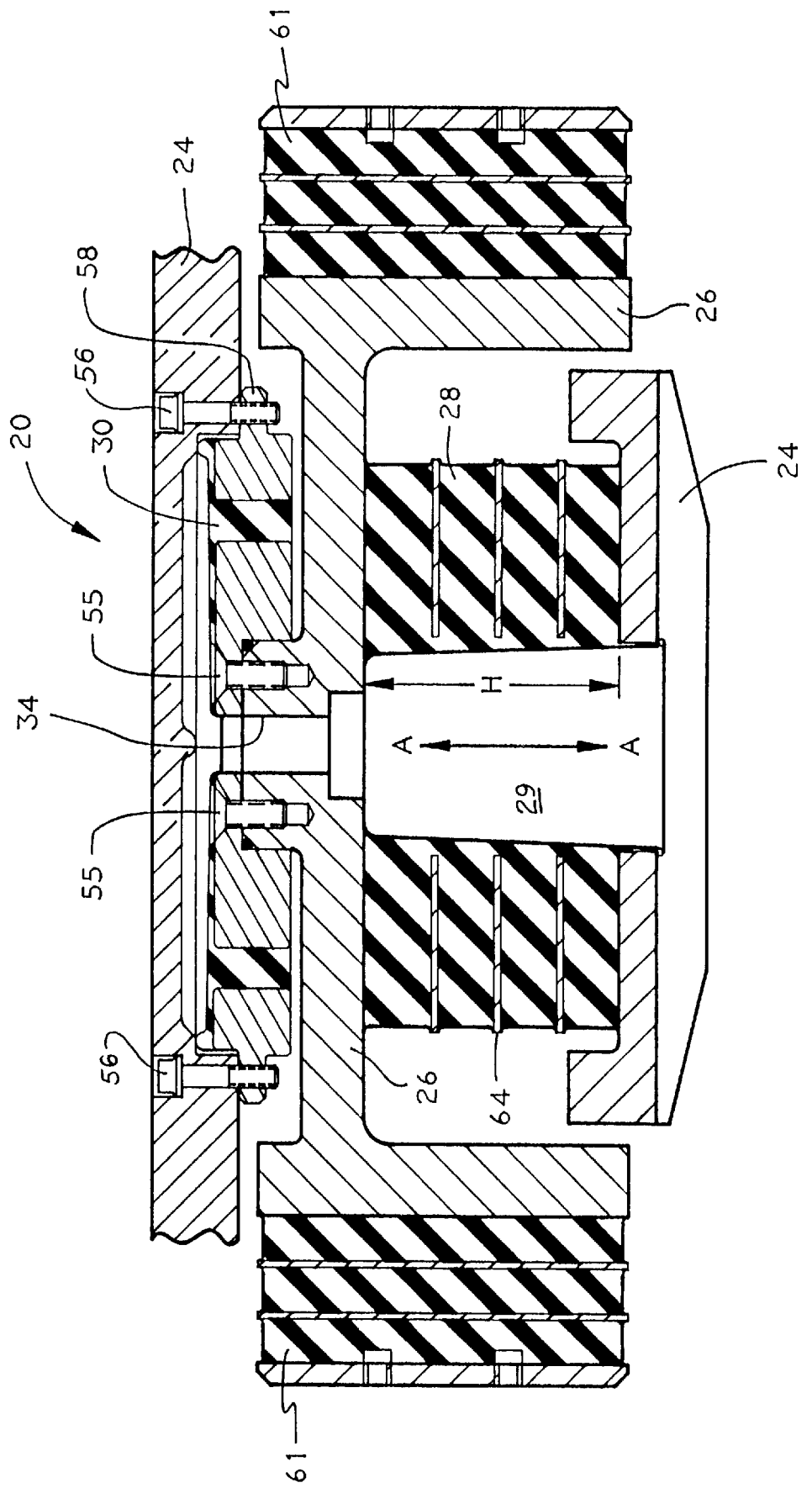
FIG. 3 is a partially-sectioned frontal view of the first embodiment of the fluid mounting with a portion of the housing not shown for clarity.

Referring now to FIG. 3, a frontal sectioned view of a portion of the first embodiment of the mounting 20 is shown, with only a portion of the housing 24 being shown, for clarity. The first elastomer section 28 may include shims. 64 to form a laminated elastomer and shim construction. An inner member which is bonded to the second elastomer section 30 attaches to the piston 26 by way of bolts 55, or other suitable attachment means, and is preferably sealed using an o-ring. The flange 58 which is bonded to the second elastomer section 30 further is connected to the upper portion of the housing 24, by way of bolts 56. A portion of the fluid passageway 34 is shown through the piston 26 and the spiral portion is not shown for clarity.

The essence of the invention is the ability of the mounting 20 to accommodate high temperatures and loads without damaging the first and second elastomer sections 28 and 30. As the first elastomer section 28 heats up, it will expand in height H. The second elastomer section 30 will be placed in shear along the axis A—A and accommodate the relatively large change in height H. Further, the first elastomer section 28 is typically in the range of between about five and ten times stiffer than the second elastomer section 30. Because of this difference, the first elastomer section 28 is free to expand in height H and the smaller shear force will be imposed on the first elastomer section 28 due to shearing of the second elastomer section 30. Because of the smaller shear force, the first elastomer section 28 will build up only a very small amount of edge strain (ENT) as compared to constrained-type mountings. A secondary advantage of not building excessive ENT is that the compensators can be made smaller because they no longer need to compensate for as much of a change in fluid volume. This is because the first elastomer section 28 is free to change its height H and need not bulge into the first fluid chamber 29 when heated, as in the related constrained-type mountings.

By way of example and not limitation, the vertical stiffness along a first axis A—A of the first elastomer section 28 is about 30,000 lb/in where the stiffness of the second elastomer section is about 3,000 lb/in. Essentially, when a load is applied along the axis A—A, the first elastomer section 28 is loaded primarily only in compression; this means the major strain on the elastomer is a bulge strain or a compression induced edge strain (ENT), with little or no direct shear strain. The second elastomer section 30 is loaded primarily only in shear, or pure shear, with little or no component of bulge strain.

Figure 4:
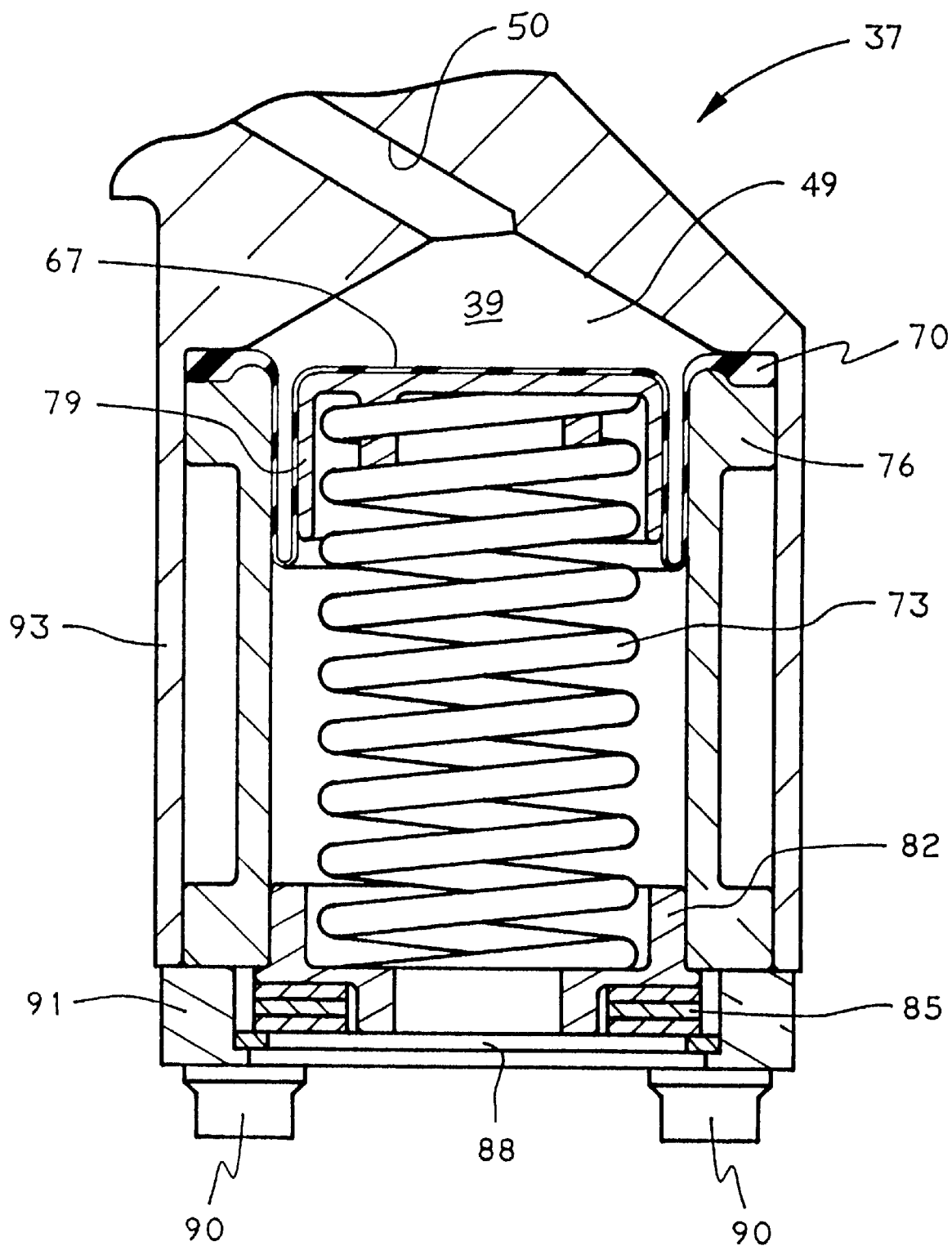
FIG. 4 is an sectioned side view of the mechanical-type volume compensator used with the fluid mounting.

Referring now to FIG. 4, a sectioned view of a mechanical compensator 37 is shown which can be used with any fluid mounting. The compensator 37 includes a third fluid chamber 49 which is connected to the first fluid chamber 29 (FIG. 1) or second fluid chamber 31 (FIG. 1), or even to the fluid passageway 34 (FIG. 1) by way of a channel 50. The channel 50 includes orifice 52 (FIG. 1), which is preferably a set screw with a small hole therethrough. The compensator 37 accommodates any fluid 39 that may be statically displaced from the first fluid chamber 29 (FIG. 1), the second fluid chamber 31 (FIG. 1), or the fluid passageway 34 (FIG. 1) as the mounting 20 is exposed to elevated temperatures portion of the fluid 39 may be displaced due to expansion of the fluid 39 or expansion of the first and second elastomer sections 28 and 30 into the first and second fluid chambers 29 and 31.

The compensator 37 is comprised of a flexible partition 67 including a seal 70. The flexible partition 67 is preferably a fabric-reinforced rolling diaphragm of high temperature Nomex® fabric and silicone elastomer construction for high-temperature applications. A spring means 73 is used for pressurizing the third fluid chamber 49, and thus pressurizing the fluid 39 contained in the mounting 20. By way of example and not by limitation, the spring stiffness is about 25–50 lb/in and the spring means 73 can be a coil spring of the conical or cylindrical type. Other types of mechanical springs such as wave springs, Belleville springs, and bellows springs are also acceptable. In this embodiment, the mechanical compensator 37 further includes a sleeve 76 for engaging with seal 70 to provide a fluid tight seal, a cup 79 for supporting flexible partition 67 and for receiving spring means 73. The spring means 73 is supported at the other end by a retainer 82.

The compression of the spring means 73 provides the static pressure within the mounting 20 which is adjusted by inserting or removing one or more spacers 85. A C-clip 88 is used to fully retain, and maintain the spring means 73 in compression. Bolts 90 are used to urge clamp plate 91 into contact with compensator housing 93 and supply the correct amount of sealing force to seal 70. Mechanical compensators 37 have the advantage that they are easily adjustable, are not temperature sensitive as compared to air-charged compensators, require less space envelope as compared to air-charge compensators, are rugged, and use standard components. In addition, they are less susceptible to pressure loss, as there is no gas to leak out.

Figure 5:
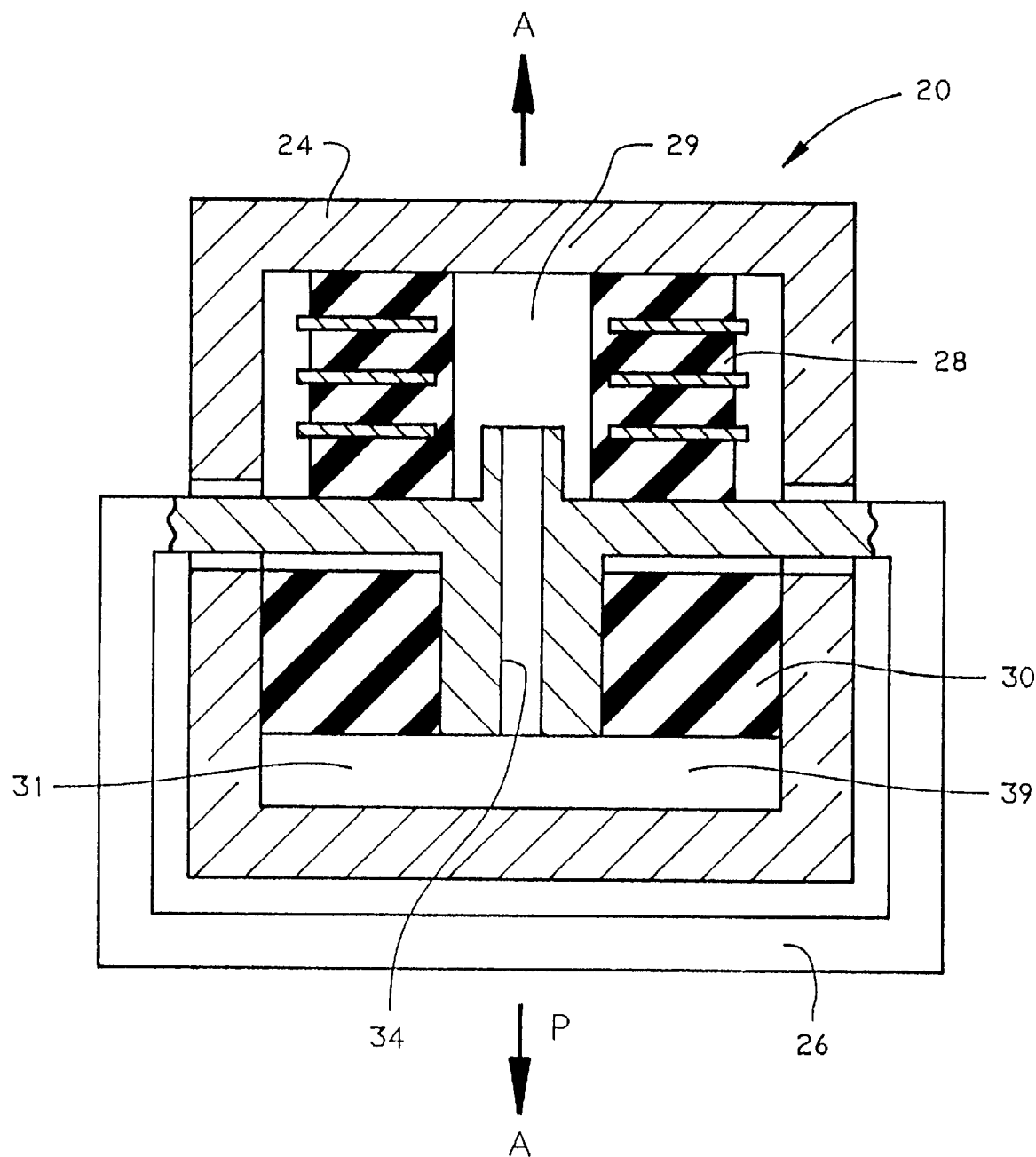
FIG. 5 is a schematic illustration of the instant invention fluid mounting.

A schematic illustration high-temperature fluid mounting of the present invention is shown in FIG. 5. The mounting 20 comprises a housing 24, a piston 26, a first elastomer section 28 partially defining a first fluid chamber 29, a second elastomer section 30 partially defining a second fluid chamber 31, and fluid passageway 34 interconnecting the first and second fluid chambers 29 and 31. In a mounting 20 of the isolator-type, it is desired to eliminate damping from the elastomer sections 28 and 30 and reduce the viscous shear of the fluid 39 to a minimum. Mountings 20 of the damper-type are equally well suited for this configuration and will perform at high temperatures. Typically, in a damper, the fluid 39 is throttled through the passageway 34 in order to create viscous shear of the fluid 39 and create viscous damping. In addition, highly-damped elastomers can be used with this invention to augment the fluid damping. By way of example and not by limitation, the volume stiffness of the first and second elastomer sections 28 and 30, for both damper and isolator applications, are typically on the order of between 500 and 5000 pounds per square inch per cubic inch (psi/in3).

Figure 6:
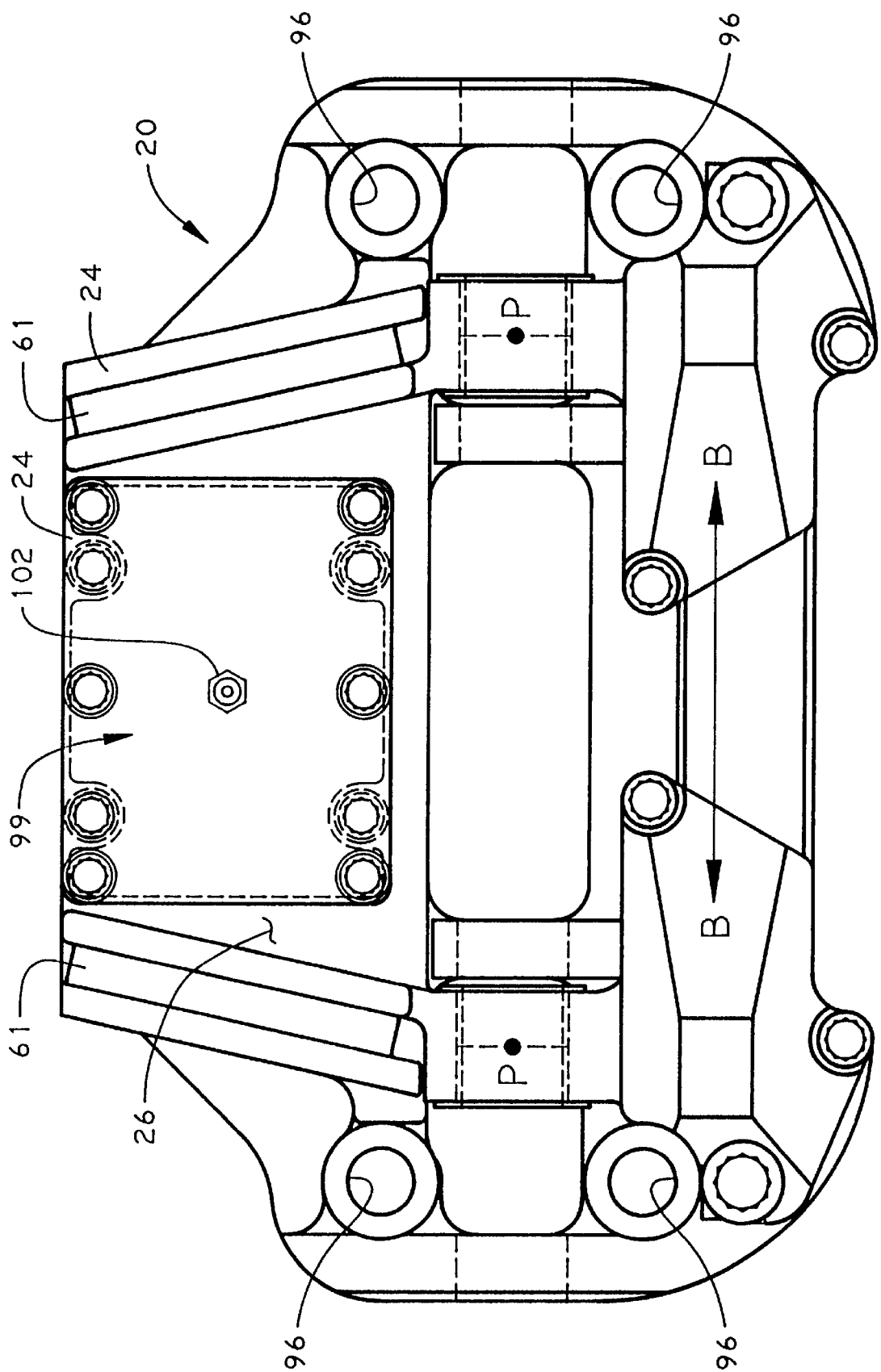
FIG. 6 is a bottom view of a second embodiment of the fluid mounting.

In FIG. 6, a bottom view of a second embodiment of the present invention high-temperature fluid mount 20 is shown wherein like elements as compared to the previous embodiment are denoted by like reference numerals. The mounting 20 includes a housing 24 which is attached to a supporting member 23 (not shown) by bolts accepted in bores 96. The mounting 20 also includes an air-charged compensator 99 which is attached to housing 24 which includes a fill valve 102. Generally, as a static load P is applied to piston 26, the piston 26 in this embodiment will rotate about pivot axis B—B and the move the fluid.

Figure 7:
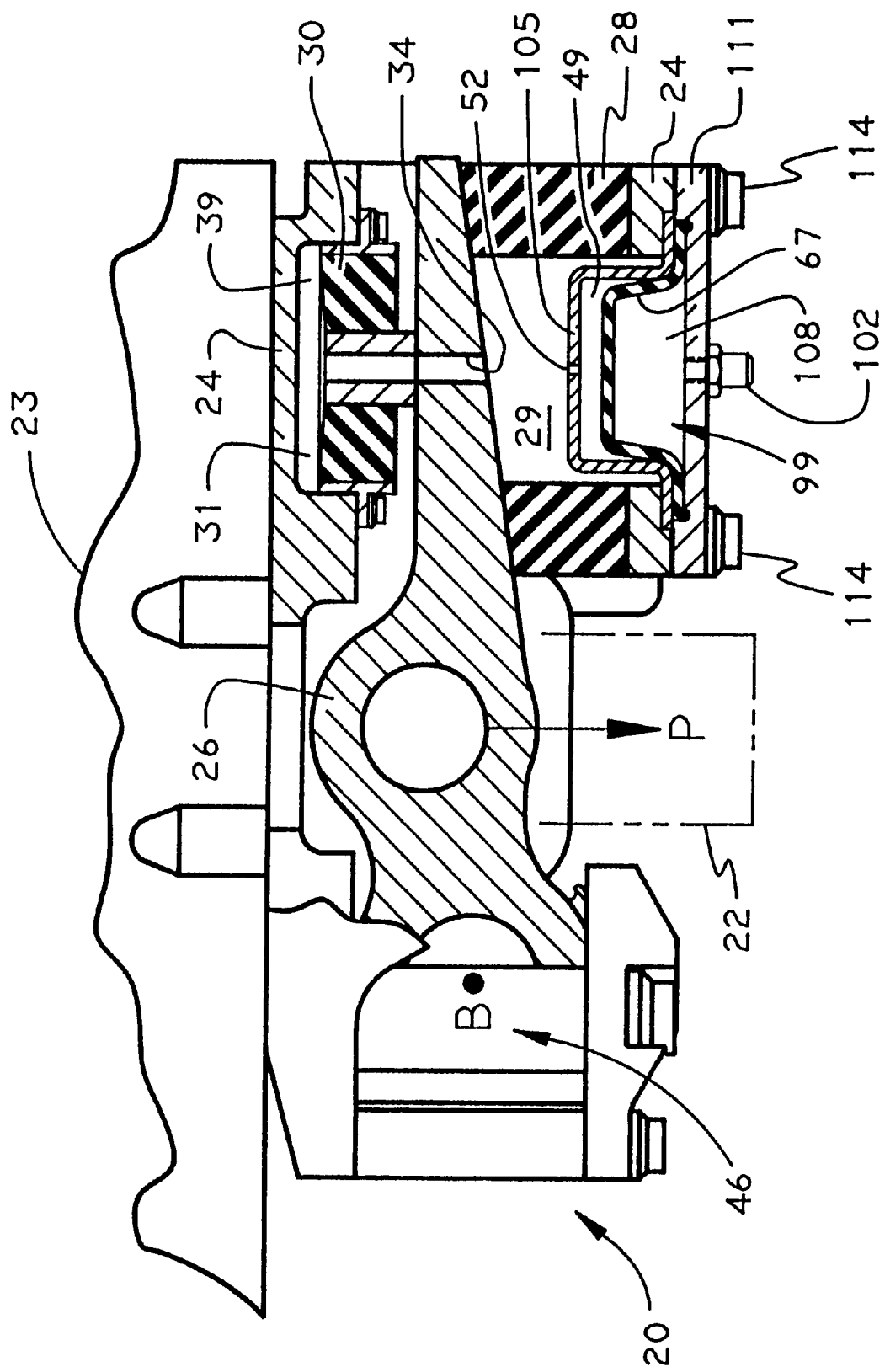
FIG. 7 is a partially-sectioned side view of a second embodiment of the fluid mounting.

A side view of a second embodiment of the high-temperature fluid mount of the present invention is shown in FIG. 7. The mounting 20 operates in the same manner as the first embodiment, except it utilizes an air-charged compensator 99. The air-charged compensator 99 is attached to housing 24 and accommodates the displaced fluid 39, and also pressurizes the fluid 39 in the mounting 20. As in the first embodiment, the third fluid chamber 49 is attached to the first or second fluid chambers 29 or 31 by orifice 52. The air-charged compensator 99 further includes flexible partition 67, valve 102, barrier plate 105, air chamber 108, and cover 111. The air-charged compensator 99 is fastened to the housing 24 by way of bolts 114.

Figure 8:
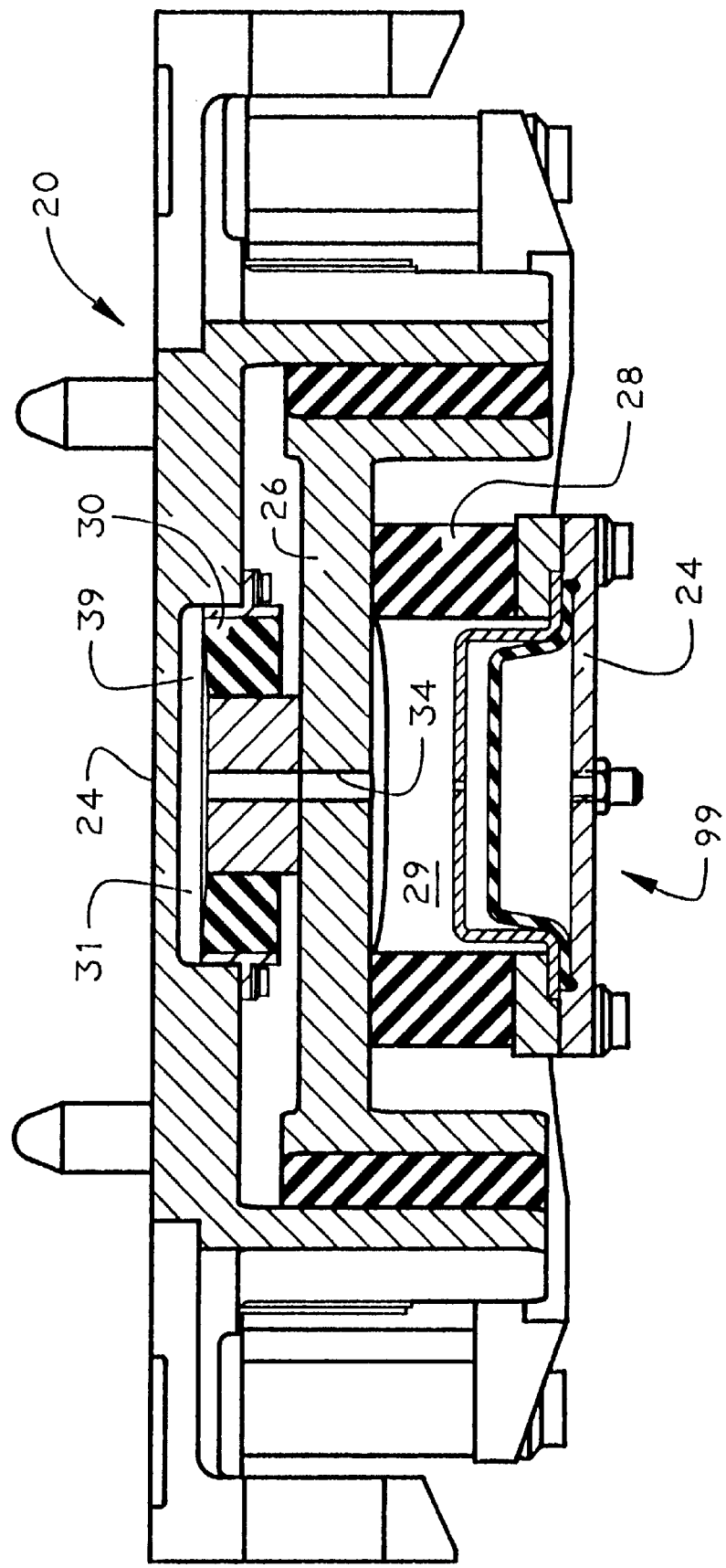
FIG. 8 is a partially-sectioned frontal view of second embodiment of the fluid mounting.

A front sectioned view of the second embodiment is shown in FIG. 8 wherein like elements as compared to the first embodiment are denoted by like reference numerals.

Figure 9:
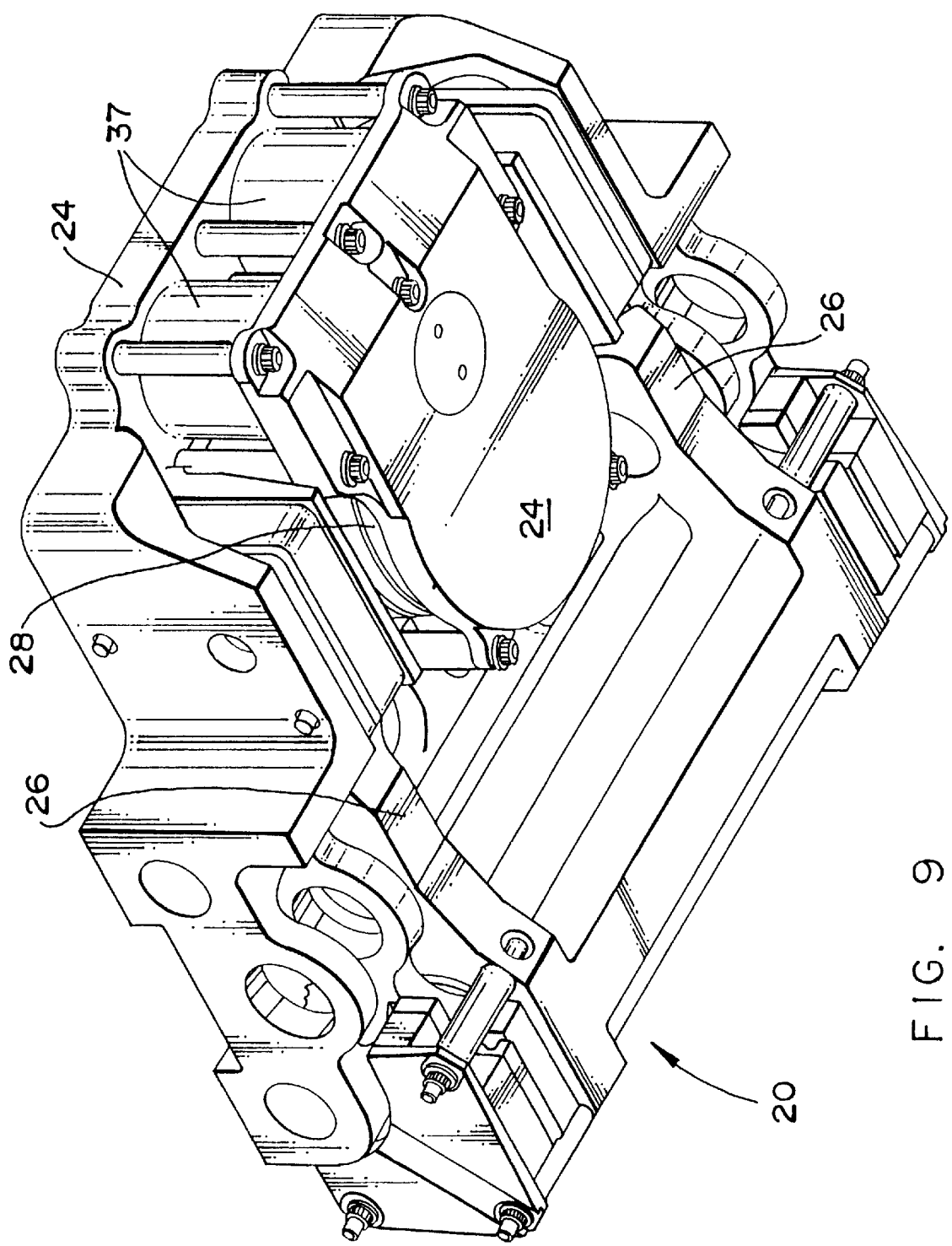
FIG. 9 is an isometric view of a third embodiment of the fluid mounting.

An isometric view of a third embodiment is shown in FIG. 9. The mounting 20 as in the previous embodiments includes a housing 24, a piston 26, a first elastomer section 28, a second elastomer section (not shown). However, in this embodiment, dual mechanical compensators 37 are attached to housing 24 and accommodate the displaced fluid 39, and also pressurizes the mounting 20. Dual compensators are used to improve the temperature stability of the mounting 20.

Figure 10:
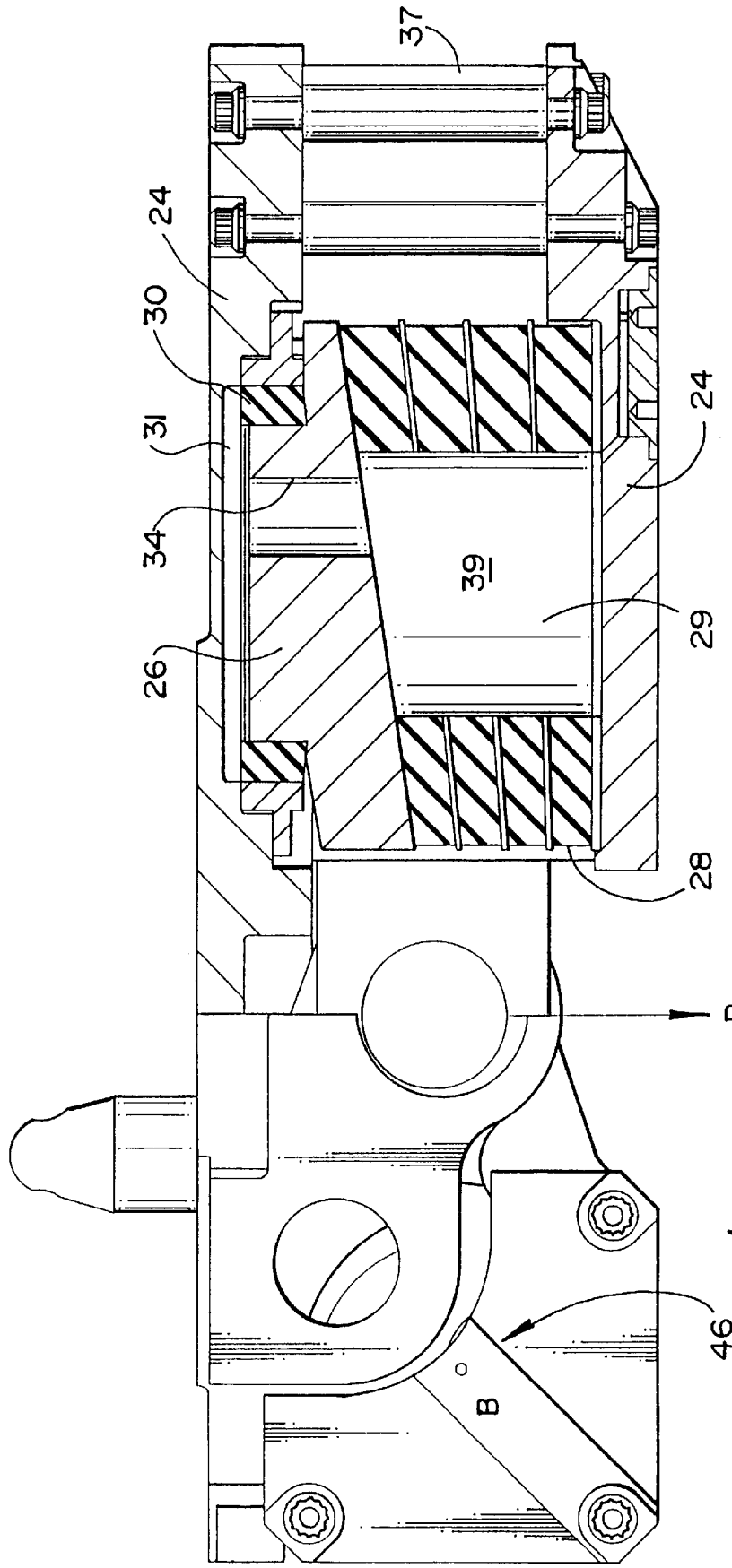
FIG. 10 is a partially-sectioned side view of a third embodiment of the fluid mounting.

A side view of the third embodiment of the present invention high-temperature fluid mount is shown in FIG. 10 wherein like elements as compared to the first embodiment are denoted by like reference numerals.

Figure 11:
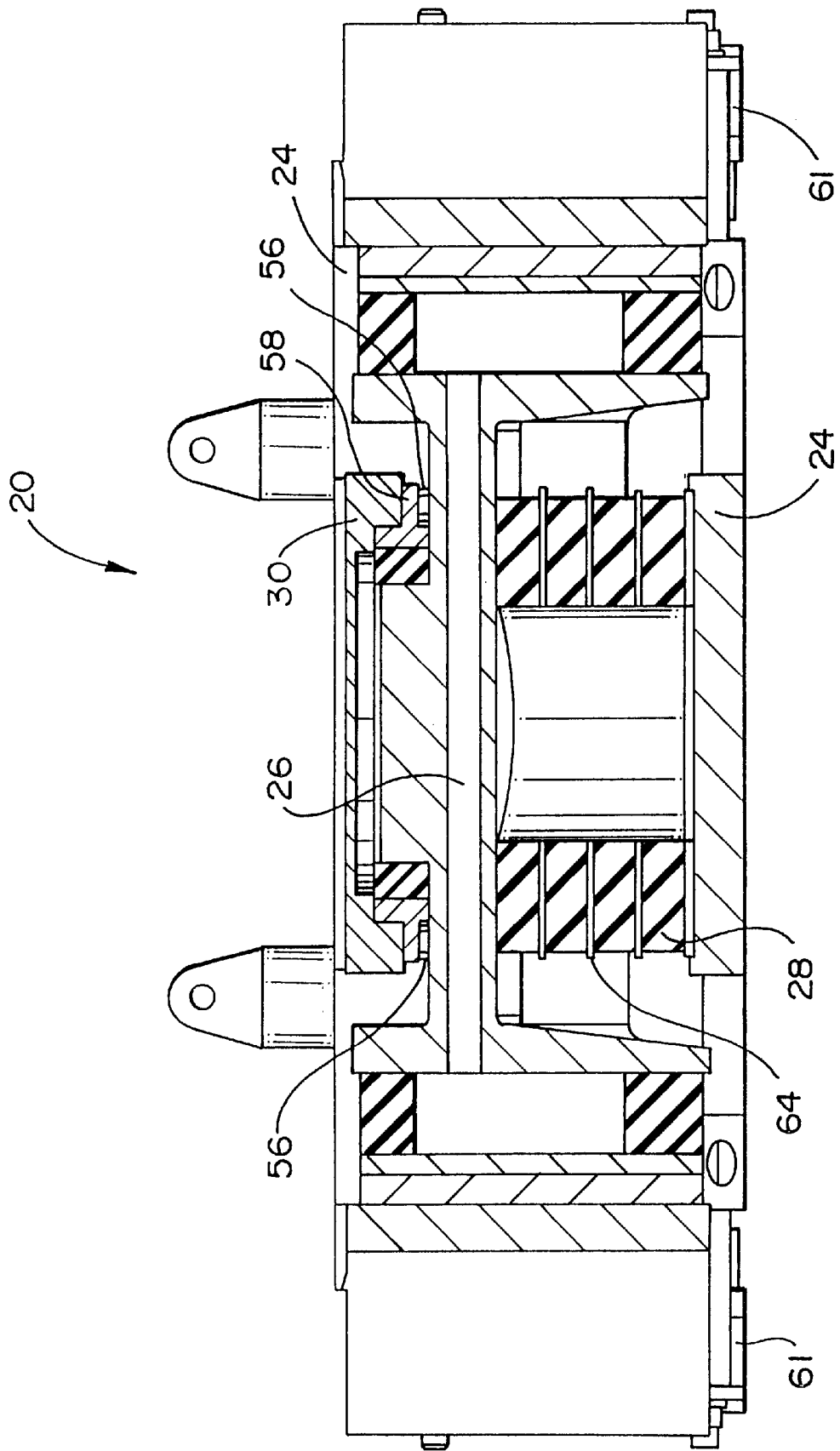
FIG. 11 is a partially-sectioned frontal view of a third embodiment of the mounting.

Referring now to FIG. 11, is shown a frontal view of a portion of the third embodiment mounting 20 with the mechanical compensators 37 not shown, and only a portion of the housing 24 shown for clarity. Again, like elements as compared to the previous embodiment are denoted by like reference numerals. It should be apparent upon reading this detailed description that the present invention provides a high-temperature fluid mounting which is capable of performing in elevated temperature environments.

The novel arrangement of elastomeric elements and usage of mechanical compensators provide the structure needed in the high-temperature mounting 20 (FIG. 1). It is an important portion of the instant invention to include a novel combination of materials which were essential to being able to survive extended periods of time at elevated temperatures as was previously not possible prior to Applicants' invention. The novel combination of polysiloxane elastomers and fluorinated fluids is essential to extended high temperature use above 200 deg F. Prior art fluid mountings have used glycol, silicone and mercury fluids as the working fluid. They have also used veneers of fluid resistant elastomers and coatings of other fluid resistant materials to attempt to keep the elastomer from being degraded or damaged by exposure to the fluid. However, these veneers, tend to delaminate and, further, their small thickness will not adequately protect the base elastomer when exposed for long periods of time. However, none of these previously used fluids, or methods of protecting the elastomer sections themselves are acceptable for high-temperature use.

The optimum fluid for most aircraft applications should be non-flammable, high density, low viscosity, very inert, non-toxic and non-corrosive. In a departure from the art, the use of fluorinated fluids in fluid mountings of the isolator-type meets all of the aforementioned requirements and exhibits low surface tension, whereas previous isolators-type mountings used high density materials with high surface tension, such as mercury. Further, the fluorinated fluids are non-toxic and very non-corrosive as compared to mercury. Prior damper-type mountings used combinations of silicone fluids and natural rubber-type elastomers which were totally unacceptable for use above 200 deg F. for extended periods of time.

The high-temperature fluid mountings for connecting a supported member to a supporting member include a housing formed to be attached to either one of the supporting and supported members, at least one elastomeric section defining at least one fluid chamber, wherein the elastomeric section is a polysiloxane polymer. In a mounting with two elastomeric sections, both sections can be comprised of a polysiloxane polymer. The at least one fluid chamber and fluid passageway have fluorinated fluid contained therein which acts as the working fluid. In double-acting mountings, the second fluid chamber contains the fluorinated fluid as well. Upon relative movement between the supported member and supporting member, fluorinated fluid will oscillates through said at least one fluid passageway.

The preferable viscosity range for the fluorinated fluid is between about 1 and 100 centistokes (cs), with 2 centistokes (cs) being optimum for isolators-type mountings. For damper-type mountings, the viscosity range preferable for the fluorinated fluid is between about 1000 and 10,000 centistokes (cs) with 2000 centistokes (cs) being optimum.

The use of the fluorinated fluid in the fluid passageway in isolator-type mountings allows the length of the passageway to be shorter and the cross-sectional area of the fluid passageway to be larger, both of which provide less damping and deepen the notch in isolator-type mountings. In damper-type mountings, fluorinated fluids of higher viscosity (about 2000 cs) can be used in combination with highly-damped elastomers to provide the capability of exhibiting very high tan del (greater than 0.8). The fluorinated fluids which are preferred are perfluorinated polyether, poly (hexafluoropropylene epoxide), fluoroalkylpolyether and completely fluorinated fluorocarbon oil. The most preferred fluorinated fluid for an isolator-type mounting is a perfluorinated polyether available from Montefluos under the tradename of Galden® which has a viscosity in the range from about 1 cs to 100 cs, and preferably Galden® D02 with a viscosity of about 2 cs. Other fluids such as poly (hexafluoropropylene epoxide) available from Dupont under the tradename of Krytox®, a perfluorinated fluid of higher viscosity known as Fomblin® available from Montefluos, and fluorocarbon oils available from 3M under the trademark of Fluorinert™ will function in fluid mounts as well.

Polysiloxane polymers are used for high-temperature fluid mounts in combination with the fluorinated fluids to achieve the capability of surviving for extended periods of time at greater than 200 deg F. Typically, 5000 hours of operation may be required for aerospace high-temperature applications over 200 deg F. Typical fluid mountings include a housing, a piston, at least one elastomeric section defining a fluid chamber and a fluid passageway. The at least one elastomeric section in the present invention comprises a polysiloxane polymer, generically known as a silicone elastomer, and having monomer repeat units of the form;

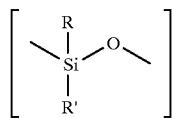

In this monomer repeat unit, the functional groups R and R' can be the same or different and are selected from the functional groups; methyl, ethyl, phenyl, trifluoropropyl, and vinyl and the monomeric repeat units (units of the abovementioned form which repeats in a chain-like fashion) can be the same or different. In other words, R and R' could be the same, such as when R=methyl and R'=methyl, or they could be different, such as when R=methyl and R'=vinyl. Other monovalent hydrocarbon radicals, such as alkyl, aryl, aralkyl, alkylaryl, alkenyl, halegenated and cyano-substituted aryl radical could be used as well. This polysiloxane polymer includes homopolymers, copolymers, terpolymers, and higher order copolymers of the abovementioned form which have a monomer repeat unit including a diorganosiloxane.

The use of a polysiloxane polymer having monomer repeat units of the abovementioned form wherein R and R' are selected from the functional groups of methyl, ethyl, phenyl, trifluoropropyl, and vinyl in combination with a fluorinated fluid contained within said fluid chamber allows the fluid mounting to withstand, without appreciable degradation, temperatures greater than 200 deg F. as was not possible by prior combinations of fluid and elastomers. Significant testing led to the selection of an optimal combination of fluid and elastomer as shown in FIGS. 12 and 13.

Figure 12:
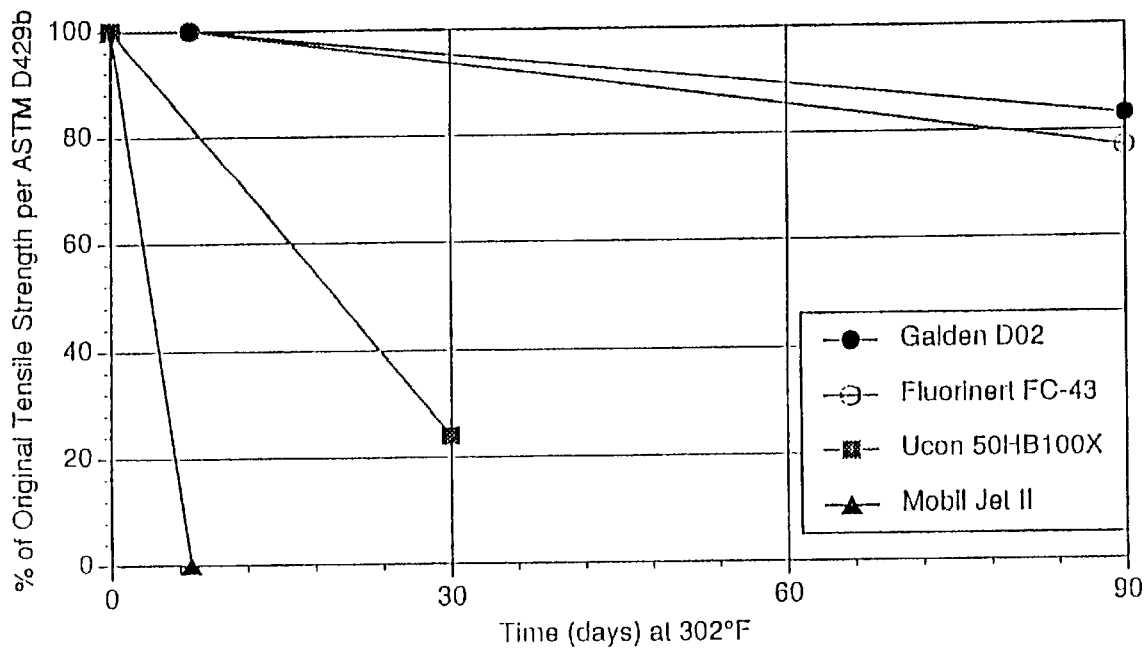
FIG. 12 is a graphical presentation of the tensile results after exposure of a polysiloxane polymer to various fluids.
Figure 13:
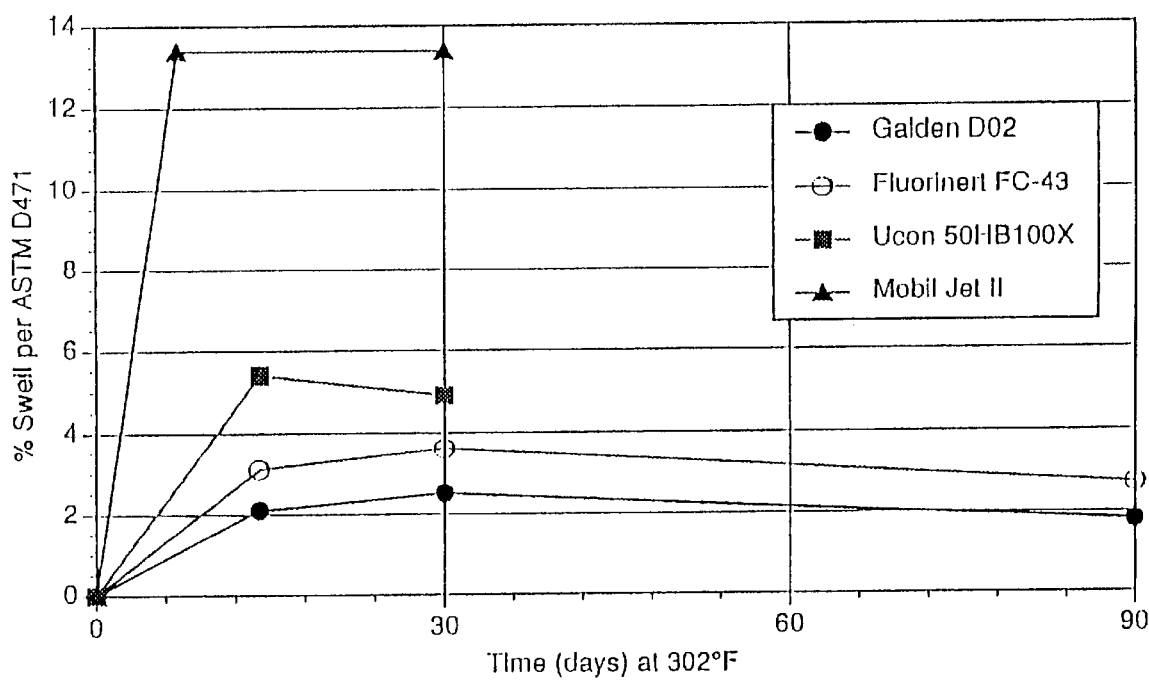
FIG. 13 is a graphical presentation of the volume swell results for various fluids on a polysiloxane polymer.

Referring now to FIG. 12, the test results are illustrated from a test comparing the percent of original tensile strength of a sample vs. number of days of immersion at 302 deg F. The testing included various fluids such as: Mobil Jet II Hydraulic oil, Ucon 50HB100X polyglycol and several fluorinated fluids, specifically Galden D02 and Fluorinert FC-43. The results indicate that the fluorinated fluids do not aggressively attack the polysiloxane polymer and more specifically, the fluorinated fluids do not aggressively attack a polysiloxane polymer which is comprised of from about 98 to 100 mol percent of a monomer repeat unit of the form:

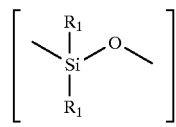

where R1 is methyl and from about 0 to 2 mol percent of a monomer repeat unit of the form:

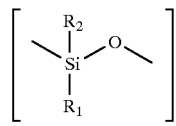

where R2 is vinyl and R1 is methyl. As the results indicate, the hydraulic fluids and polyglycols were not acceptable at elevated temperatures. The tensile testing was performed per ASTM D429 method B.

Referring now to FIG. 13, the test results are illustrated from a test comparing the percent volume swell of a sample vs. number of days of immersion of the sample at 302 deg F. The testing included immersing samples in various fluids such as: Mobil Jet II Hydraulic oil, Ucon 50HB100X polyglycol, and several fluorinated fluids, specifically Galden D02 and Fluorinert FC-43. The results indicate that the fluorinated fluids do not significantly swell the polysiloxane polymer sample used. Also, Jet oils do significantly swell polysiloxane elastomers.

Another embodiment of polysiloxane polymer which proves to be a suitable for high-temperature fluid mountings is a polysiloxane polymer comprised of from about 85 to 100 mol percent of a first monomer repeat unit of the form:

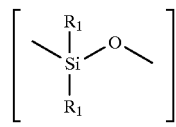

where R1 is methyl and from about 0 to 2 mol percent of a monomer repeat unit of the form:

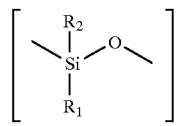

where R2 is vinyl and from about 0 to 15 mol percent of a monomer repeat unit of the form:

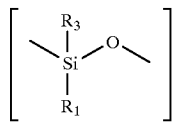

where R3 is phenyl. These types of terpolymers are normally used because of their performance over a broad temperature range. In addition, a broad range of damping is possible (from about 0.1 to 0.7 loss factor), making this polymer suitable for isolator-type and damper type high-temperature mountings.

While several embodiments of the present invention have been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A fluid mounting for connecting a supported member to a supporting member, comprising:
   (a) a housing formed to be attached to one of said supporting and supported members;
   (b) a first elastomer section which is loaded primarily only in compression attached to said housing and defining at least a portion of a first fluid chamber;
   (c) a second elastomer section which is loaded primarily only in shear attached to said housing and defining at least a portion of a second fluid chamber;
   (d) at least one fluid passageway interconnecting said first and said second fluid chambers;
   (e) a piston formed to be attached to the other of said supporting and supported members, said piston interacting with said first and said second fluid chambers and said first and said second elastomer sections such that relative movement between said supported member and supporting member oscillates a fluid through said at least one fluid passageway and back and forth between said first and said second fluid chambers.

2. A fluid mounting in accordance with claim 1 wherein a stiffness of said first elastomer section along a first axis is at least ten time greater than a corresponding stiffness along a corresponding first axis of said second elastomer section.

3. A fluid mounting in accordance with claim 1 wherein said first elastomer section is further comprised of laminated elastomer and shim construction.

4. A fluid mounting in accordance with claim 1 wherein said second elastomer section is an oval shaped annulus.

5. A fluid mounting in accordance with claim 1 wherein said at least one fluid passageway includes a spiral portion.

6. A fluid mounting in accordance with claim 1 wherein expansion of said fluid is accommodated by a mechanical compensator.

7. A fluid mounting for connecting a supported member to a supporting member, comprising:
   (a) a housing formed to be attached to one of said supported member and said supporting member;
   (b) a piston formed to be attached to the other of said supported member and said supporting member;
   (c) a first fluid chamber defined by a first elastomeric section;
   (d) a second fluid chamber defined by a second elastomer section;
   (e) a first fluid passageway interconnecting said first and said second fluid chambers;
   (f) a second fluid passageway interconnecting a third chamber to at least one of said first and said second chambers;
   (g) a fluid contained within said first, second and third fluid chambers; and
   (h) a mechanical compensator interacting with said third chamber and compensating for the expansion of said fluid and said first elastomer and said second elastomer section.

8. A fluid mounting in accordance with claim 7 wherein said first elastomer section is loaded primarily only in compression and said second elastomer section is loaded primarily only in shear.

9. A fluid mounting in accordance with claim 7 wherein said mechanical compensator includes a coil spring and a flexible fabric reinforced diaphragm.

10. A fluid mounting in accordance with claim 9 wherein said mechanical compensator includes at least one spacer for adjusting the compression imposed on said coil spring.

11. A fluid mounting in accordance with claim 7 wherein mechanical spring means are used to statically pressurize said fluid.

12. A fluid mounting for connecting a supported member to a supporting member, comprising:
   (a) a housing formed to be attached to one of said supporting and supported members;
   (b) a first elastomeric section attached to said housing defining a first fluid chamber;
   (c) a second elastomeric section attached to said housing defining a second fluid chamber;
   (d) a fluid passageway interconnecting said first and said second fluid chambers, said fluid passageway including a length and a cross-sectional area, said length and said cross-sectional area of said fluid passageway being tuned to provide a dynamic stiffness notch at a particular operating frequency;
   (e) a fluorinated fluid substantially filling said first fluid chamber, said second fluid chamber, and said fluid passageway;
   (f) a piston formed to be attached to the other of said supporting and supported supported members, said piston interacting with said first and said second fluid chambers and said first and said second elastomer sections such that relative movement between said supported member and supporting member oscillates said fluorinated fluid through said fluid passageway and between said first and said second fluid chambers, thus providing said dynamic stiffness notch;
   whereby the use of said fluorinated fluid in said fluid passageway allows said length of said passageway to be shorter, said cross-sectional area of said fluid passageway to be larger, both of which provide less damping and deepen said notch depth.

13. A fluid mounting in accordance with claim 12 wherein said fluorinated fluid is selected from the group consisting of perfluorinated polyether, poly(hexafluoropropylene epoxide), fluoroalkylpolyether and completely fluorinated fluorocarbon oil.

14. A fluid mounting in accordance with claim 13 wherein said fluorinated fluid is perfluorinated polyether with a viscosity in the range from about 1 cs to 100 cs.

15. A fluid mounting for connecting a supported member to a supporting member, comprising:

a) a housing formed to be attached to one of said supporting and supported members;
b) a first elastomeric section attached to said housing defining a first fluid chamber, said first elastomeric section is comprised of a polysiloxane polymer;
c) a second elastomeric section attached to said housing defining a second fluid chamber, said second elastomeric section comprised of a polysiloxane polymer;
d) at least one fluid passageway interconnecting said first and said second fluid chambers;
e) a fluorinated fluid contained within said first fluid chamber, said second fluid chamber, and said at least one fluid passageway;
f) a piston formed to be attached to the other of said supporting and supported members, said piston interacting with said first and said second fluid chambers and said first and said second elastomeric sections such that relative movement between said supported member and supporting member oscillates said fluorinated fluid through said at least one fluid passageway and between said first and said second fluid chambers.

16. A fluid mounting, comprising:
a housing, a piston, an elastomeric section defining a fluid chamber, wherein said elastomeric section comprises a polysiloxane polymer having monomer repeat units of the form:

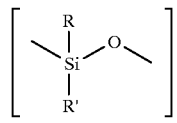

wherein R and R' can be the same or different and are selected from the functional groups consisting of methyl, ethyl, phenyl, trifluoropropyl, and vinyl; and wherein said monomeric repeat units can be the same or different.

17. A fluid mounting, comprising:
a housing, a piston, an elastomeric section defining a fluid chamber, wherein said elastomeric section comprises a polysiloxane polymer having monomer repeat units of the form:

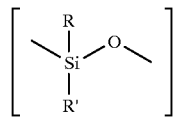

wherein R and R' can be the same or different and are selected from the functional groups consisting of methyl, ethyl, phenyl, trifluoropropyl, and vinyl; and wherein said monomeric repeat units can be the same or different; and
(b) a fluorinated fluid filling said fluid chamber.

18. A fluid mounting in accordance with claim 17 wherein said fluorinated fluid is selected from the group consisting of perfluorinated polyether, poly(hexafluoropropylene epoxide), fluoroalkylpolyether and completely fluorinated fluorocarbon oil.

19. A fluid mounting in accordance with claim 16 wherein said polysiloxane polymer is comprised of:
(a) from about 98 to 100 mol percent of a monomer repeat unit of the form:

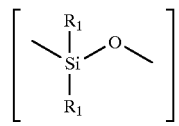

where R1 is methyl;
(b) from about 0 to 2 mol percent of a monomer repeat unit of the form:

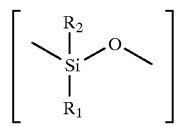

where R2 is vinyl and R1 is methyl.

20. A fluid mounting in accordance with claim 17 wherein said polysiloxane polymer is comprised of:
(a) from about 85 to 100 mol percent of a first monomer repeat unit of the form:

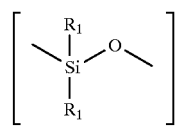

where R1 is methyl;
(b) from about 0 to 2 mol percent of a monomer repeat unit of the form:

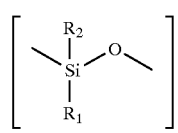

where R2 is vinyl;
(c) from about 0 to 15 mol percent of a monomer repeat unit of the form:

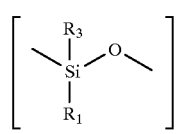

where R3 is phenyl.

21. A fluid mounting for connecting a supported member to a supporting member, comprising:
(a) a housing formed to be attached to one of said supported member and said supporting member;
(b) a piston formed to be attached to the other of said supported member and said supporting member;
(c) a first fluid chamber defined by a first polysiloxane elastomer section;
(d) a second fluid chamber defined by a second polysiloxane elastomer section;
(e) a first fluid p ass ageway interconnecting said first and said second fluid chambers;

(f) a second fluid passageway interconnecting a third chamber to at least one of said first and said second chambers;

(g) a fluorinated fluid contained within said first fluid chamber, said second fluid chamber, and said third fluid chambers; and (h) a mechanical compensator interacting with said third chamber and compensating for the expansion of said fluorinated fluid and said first and said second polysiloxane elastomer sections.

* * * * *